Figure 1:
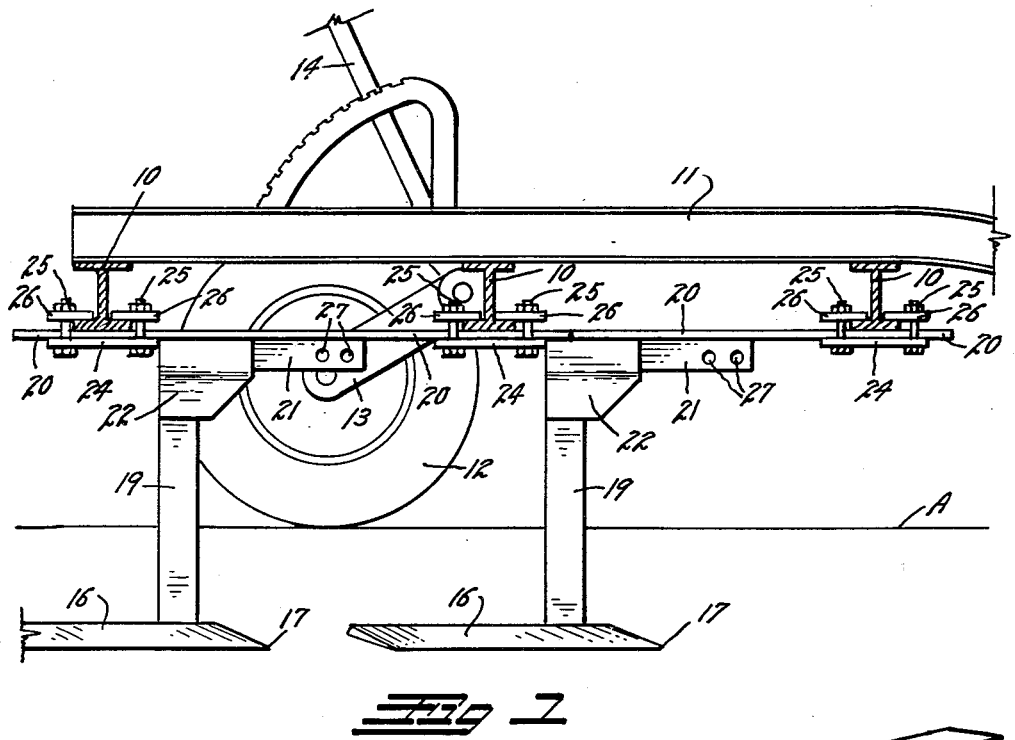

Sept. 11, 1956 N. M. DORSCH 2,762,286
SUB-SURFACE PLOWS
Filed Dec. 1, 1953

INVENTOR.
NEAL M. DORSCH
BY
ATTORNEY

United States Patent Office 2,762,286
Patented Sept. 11, 1956

2,762,286

SUB-SURFACE PLOWS

Neal M. Dorsch, Flagler, Colo.

Application December 1, 1953, Serial No. 395,502

2 Claims. (Cl. 97—78)

This invention relates to a sub-surface plow. In the arid regions of the West, it has been found that if the plowing is done below the surface of the land, with a minimum of disturbance of surface soil and trash, wind and water erosion is reduced to a minimum. The sub-surface plowing breaks and grooves the hard pan below the usual plowing level so as to make it pervious to moisture and the surface clods and trash produce shade that retards evaporation of the water from the soil. Therefore, rain water is thereby retained and slowly delivered to the growing crop during the dry periods between rains. Surface plowing also tends to break all clods and reduce the top soil to a dry powder which is in prime condition to be blown and eroded away by the wind intermediate the rain periods.

The principal object of this invention is to provide a highly efficient sub-surface plow which can be drawn with a minimum of power, and which will loosen and break the hard pan below the surface with a minimum of disturbance of the surface soil and trash.

Present sub-surface plows are attached to a curved or hooked plow beam which in turn is attached to a frame bar of the plow frame or cultivator. In hard soils, the strain upon the frame bar is sufficient to twist and bend the bar, and the curved plow beams create surface disturbance and tend to lift, hold and drag vines and trash.

A further object of this invention is to provide means for attaching a sub-surface plow to a plow frame which will avoid all tortional or twisting strains upon the frame members, and to provide a plow beam which will have very little lateral width so as to reduce surface disturbance, and which will not curve upwardly to elevate and drag clods and trash.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 2:
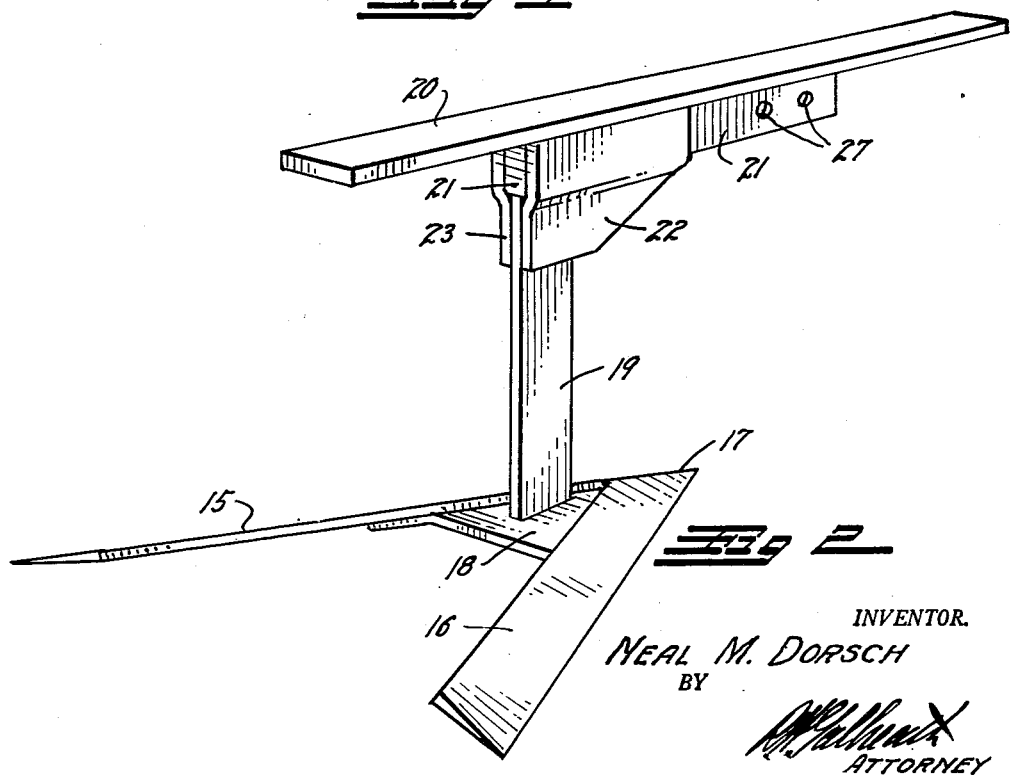

In the drawing:

Fig. 1 is a longitudinal section through a conventional sub-surface plow frame, illustrating the improved sub-surface plows in place thereon; and Fig. 2 is a perspective view, illustrating one of the improved sub-surface plows detached from the plow frame.

In Fig. 1, parts of a conventional sub-surface plow frame are designated by numerals as follows: lateral plow-supporting beams 10, tongue bar 11, ground wheels 12, wheel arms 13, and depth-adjusting lever 14.

It is customary to attach sub-surface plows, cultivator blades, and the like to the beams 10, but in the usual construction each plow or cultivator blade is attached to only one of the beams 10. The result is that the reaction of the plow applies a tortional twist to the beam, twisting the latter and in some cases wrecking the frame. The improved sub-surface plows are so constructed that each plow is attached to two of the beams 10 so that all tortional strains on the beams are eliminated and only direct compression and tension strains are applied thereto thereby eliminating all twisting of the frame beams.

The improved plow comprises two similar plow blades 15 and 16 formed from flat, elongated, transversely beveled strips of steel having sharpened leading edges. The two plow blades 16 are inclined upwardly at their trailing edges on a slight incline, and are welded or otherwise secured together at the front to form a relatively sharp, inclined point or apex 17 from which the blades flare rearwardly on an angle of substantially 70° to form a triangle with the sharp edges lying in a substantial horizontal plane.

A horizontal brace plate 18 is welded to and extends between the blades 15 and 16 adjacent their joint apex. A vertical post 19 is welded at its lower extremity to the plate 18. The post 19 is relatively thin in a transverse direction and relatively wide in a longitudinal direction, and is so positioned that its greatest width will lie along the altitude of the triangle formed by the blades 15 and 16.

The upper extremity of the post 19 is welded or otherwise secured to an elongated, horizontal attachment bar 20 positioned at right angles to the post 19 and in the vertical plane of the altitude of the triangle of the blades. A relatively heavy stiffening bar 21 is welded or otherwise attached to the lower surface of the bar 20 along the medial line of the latter to resist bending of the bar 20.

Two oppositely positioned brace plates 22 and 23 overlap the bar 21 and the post 19 and are welded or otherwise secured to both to rigidly maintain the post 19 at 90° to the bar 20. The bar 21 is sufficiently long to overlap two of the cultivator beams 10.

The bars 20 are attached to the beams 10 by any suitable conventional clamping means such as used for clamping cultivators and plows to frames. As illustrated, a clamp plate 24 is positioned below each extremity of the attachment bar 20 and below the beams 10. The clamp plate is drawn upwardly by means of suitable clamp bolts 25 which pass through flange clamps 26 which overhang the flanges of the beams 10. The post 19 is so positioned longitudinally of the attachment bar 20 that it will contact the rearmost clamp plate 24 and prevent rearward movement of the post, as shown in Fig. 1.

The forward extremity of the stiffening bar 21 is preferably provided with bolt holes 27 to which the bearing of a coulter wheel post may be attached, should it be desired to have a rolling coulter precede the plow blades 18.

The improved plows are attached along the plow beams in any desired spacing and arrangement, preferably in staggered arrangement, and sufficiently close so that the width of the triangle formed by the plow blades 15 and 16 will exceed the spacing of the plows so as to form overlapping paths.

In use, the plows are lowered below the ground surface, indicated at "A" in Fig. 1, and the entire assembly is drawn forward. The narrow posts 17 cause very little interference to the forward movement through the earth. The blades 15 and 16 loosen and lift the soil below the surface to provide an open, water-absorbent soil condition. They also serve as weed-cutting blades for the roots of deep-growing weeds which will be severed by the blades.

It will be noted that the tendency of the posts to bend rearwardly is resisted by their extreme longitudinal width. The tendency of the attachment bars 20 to bend at their middles is resisted by the stiffening bar 21. All tendency to twist the frame beams 10 is removed, due to the fact that the attachment bars 20 overlap two of the frame beams 10.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A sub-surface plow for use with a wheeled plow frame of the type having two spaced-apart, transversely-extending frame bars, comprising: two inclined plow blades formed with leading cutting edges lying in a horizontal plane, each of said blades being inclined transversely upwardly toward its trailing edge, said blades being secured together at their forward extremities and flaring rearwardly in V-shaped relation; a flat, horizontal, triangular-shaped horizontal brace plate secured between said blades adjacent their joined extremities and disposed in a plane above the plane of said leading edges; a vertical post resting upon and being secured to said flat brace plate and arising therefrom, said post being relatively thin in a transverse direction and relatively wide in a longitudinal direction; a horizontal stiffening bar resting on and secured to the upper extremity of said post and extending forwardly therefrom; a brace plate secured at each side of said post, said brace plates overlapping said stiffening bar and being fixedly secured thereto; means for attaching a coulter disc to the forward extremity of said stiffening bar; a flat, elongated, horizontal attachment bar lying on and being secured to said stiffening bar in alignment therewith, said attachment bar extending forwardly and rearwardly of said stiffening bar; and means for securing the forward and rear extremities of said attachment bar below the frame bars of said plow frame.

2. A sub-surface plow as defined in claim 1, wherein said securing means for said attachment bar forms a shoulder against which the rear extremity of said stiffening bar abuts.

References Cited in the file of this patent

UNITED STATES PATENTS

| | | |
|---|---|---|
| 1,271,702 | Gruenick | July 9, 1918 |
| 1,362,155 | Towner | Dec. 14, 1920 |
| 1,625,834 | Stilgenbauer | Apr. 26, 1927 |
| 2,503,884 | Noble et al. | Apr. 11, 1950 |
| 2,597,608 | Altgelt et al. | May 20, 1952 |
| 2,677,321 | Ferguson | May 4, 1954 |

FOREIGN PATENTS

| | | |
|---|---|---|
| 468,662 | France | Apr. 29, 1914 |